United States Patent [19]

Schlansker et al.

[11] Patent Number: 5,404,484
[45] Date of Patent: Apr. 4, 1995

[54] CACHE SYSTEM FOR REDUCING MEMORY LATENCY TIMES

[75] Inventors: Michael S. Schlansker, Los Altos; Vinod K. Kathail, Cupertino; Rajiv Gupta, Los Altos, all of Calif.

[73] Assignee: Hewlett-Packard Company, Palo Alto, Calif.

[21] Appl. No.: 945,561

[22] Filed: Sep. 16, 1992

[51] Int. Cl.⁶ .......................................... G06F 12/12
[52] U.S. Cl. ............................ 395/425; 364/DIG. 1; 364/243.41
[58] Field of Search ... 364/200 MS File, 900 MS File; 395/400, 425

[56] References Cited

U.S. PATENT DOCUMENTS

| | | | |
|---|---|---|---|
| 4,761,731 | 8/1988 | Webb | 395/425 |
| 5,233,702 | 8/1993 | Emma et al. | 395/425 |
| 5,239,644 | 8/1993 | Seki et al. | 395/425 |

FOREIGN PATENT DOCUMENTS

| | | |
|---|---|---|
| 0375864A2 | 7/1990 | European Pat. Off. . |
| 1532798 | 11/1978 | United Kingdom . |
| 2215099 | 9/1989 | United Kingdom . |

*Primary Examiner*—Joseph L. Dixon
*Assistant Examiner*—Hiep T. Nguyen

[57] ABSTRACT

The improved cache system reduces the effects of latency times by utilizing a preload instruction inserted by the compiler into the code. The preload instruction is sent sufficiently in advance of the corresponding load instruction to guarantee that the relevant data is in the cache memory when the load instruction is received. In addition, the invention prevents the pollution of the cache with data that will only be used once during the expected lifetime of the data in the cache. This second feature of the invention assures that a large number of references to data that will only be used once does not result in the contents of the cache being replaced with the subsequent need to reload the contents after the data references have been completed.

7 Claims, 3 Drawing Sheets

CACHE SYSTEM FOR REDUCING MEMORY LATENCY TIMES

FIELD OF THE INVENTION

The present invention relates to computer memory systems, and more particularly to memory systems in which the central processing unit is much faster than the main memory.

BACKGROUND OF THE INVENTION

Conventional computer systems utilize memory systems that provide data to the central processing unit (CPU) in response to load instructions and store data into the memory systems in response to store instructions. The cost per computation for the CPU has decreased much faster than the cost per byte of memory. In addition, as computational tasks have become more complex, the size of the main computer memory has dramatically increased. As a result, providing a main memory that operates at the same speed as the CPU has become economically impractical.

To avoid the high cost of providing a main memory that operates at CPU computational speeds, many systems utilize cache memories. A cache is a high speed buffer used to store the most recently used data. When load instructions are issued to the cache, the cache checks its buffer to determine if the data is present. If the data is already present in the cache, the cache returns the data to the CPU. If the data is not present, the cache must load the data from the main memory. Since the main memory is much slower than the cache, this results in a significant delay in the program execution. Each time the cache loads data from the main memory, some of the data stored in the cache must be eliminated to make room for the new data.

Similarly, store instructions are also issued to the cache. If the data for the address specified in the store instruction is already in the cache, the cache updates the data to reflect the values specified in the store instruction. If the data is not present, the cache makes an entry for the address specified in the store instruction and notes the data to be stored at that address. In the case of a "write-through" cache, the data is also sent immediately to the main memory so that the main memory always has a correct copy of the data. In non-write-through cache systems, the data entry in the cache is marked to indicate that it differs from the value stored at the address in question in the main memory. When the data entry is replaced during a subsequent operation, the entry so marked is written to the main memory prior to being replaced.

To be effective, the data in the cache must be utilized, on average, a number of times before it is displaced from the cache by new data entering from the main memory in response to load instructions that cannot be satisfied by the data already in the cache. Each time data is acquired from the main memory, the CPU must wait. If the data is used several times while it is in the cache, this delay is amortized over several load instructions; hence, the average delay per load instruction is substantially reduced. No such reduction occurs if the data is used only once.

In fact, utilizing the cache for transferring data that is to be used only once actually degrades system performance. As noted above, each time a new data word is moved into the cache from main memory, a data word stored in the cache must be eliminated. Some of the data words that are eliminated would have been used again had these words not been eliminated in response to the load instruction for the data word that was to be used only once. Hence, passing data words that are to be used only once during their residence time in the cache degrades cache performance. This degradation can be reduced by increasing the size of the cache; however, this solution substantially increases the cost of the cache.

The time delay encountered in retrieving data from the main memory is often dominated by the latency time of the main memory. The latency time of the memory system is defined to be the number of cycles after the initiation of the load operation at which the data for the load is returned from the memory and is available for use. One method for avoiding this inefficiency is to issue the load instruction sufficiently before the need for the data to allow the memory time to retrieve the data and have it ready when needed. However, this solution results in two problems. First, an intervening store instruction directed to the same memory address can result in erroneous data being returned to the CPU.

Second, if data being retrieved will only be used once, accessing the data through the cache can actually reduce the efficiency of the cache. To be effective, the data in the cache must be utilized, on average, a number of times before it is displaced from the cache by new data entering from the main memory in response to load instructions that can not be satisfied by the data already in the cache. Each time data is acquired from the main memory, the CPU must wait. If the data is used several times while it is in the cache, this delay is amortized over several load instructions; hence, the average delay per load instruction is substantially reduced. No such reduction occurs if the data is used only once. Furthermore, the data displaced by the incoming data may need to be reloaded into the cache in response to a subsequent load instruction. When this occurs, the system will be further penalized by the delays in reloading the displaced data.

Broadly, it is the object of the present invention to provide an improved computer memory system.

It is a further object of the present invention to provide a memory system in which the data that is to be used only a few times need not pass through the cache memory.

It is a still further object of the present invention to provide a cache memory system in which the delays resulting from the latency time of the main memory are substantially reduced compared to prior art systems.

These and other objects of the present invention will become apparent to those skilled in the art from the following detailed description of the present invention and the accompanying drawings.

SUMMARY OF THE INVENTION

The present invention comprises a memory buffer system for delivering information stored in a system memory to a data processing system in response to load instructions from the data processing system. The buffer may be used in conjunction with a conventional cache system. The invention includes a buffer sub-system which receives preload, load and store instructions from the data processing system, each such instruction including an address specifying a data word in the system memory. The buffer sub-system receives data from the cache memory and the system memory and stores the data in a register file having data entries which, include an address and a data word. The buffer sub-system includes a controller which in response to a received load instruction, delivers the most recent value for the data identified by the address in the received load instruction to the data processing system. The controller also controls the cache sub-system and can receive data therefrom. The controller, in response to a received preload instruction, causes the data associated with the address in said preload instruction to be stored in said register file. The controller also monitors store instructions issued by the data processing systems and updates the values stored in the register file if said address in a store instruction matches the address of one of the data entries in the register file.

DETAILED DESCRIPTION OF THE INVENTION

Figure 1:
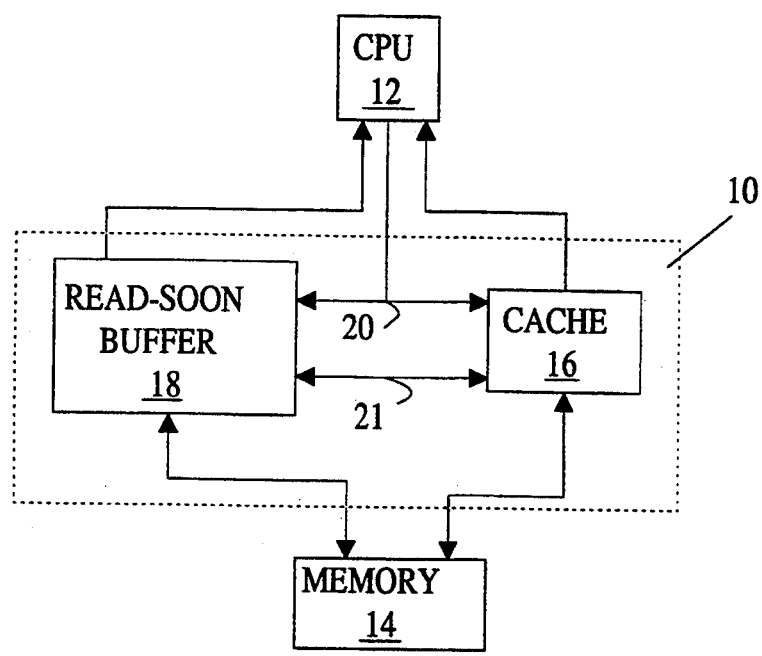
FIG. 1 is a block diagram of a computer system utilizing a cache system according to the present invention.

The present invention may be more easily understood with reference to FIG. 1 which is a block diagram of CPU 12 which utilizes a main memory 14 having a speed significantly less than that of CPU 12. Memory 14 is accessed by a memory buffer 10 according to the present invention. Memory buffer 10 provides two data paths between CPU 12 and memory 14. The first path is buffered through cache 16 which operates in a manner analogous to that of a conventional cache memory. The "pollution" of cache 16 by data that would only be used once if accessed through cache 16 is alleviated by including a second data path which utilizes a buffer 18 that will be referred to as a "read-soon" buffer, since data not read shortly after arriving in this buffer is likely to be over-written, and hence, not be available if it is not accessed shortly after arriving at the buffer.

In prior art systems the CPU accesses data in the memory by issuing a load command to the cache. The load command specifies the address in the memory at which the data to be retrieved is stored. When the cache receives the load command, it checks the data already stored therein to determine if the data for the address in question is already in the cache. If the data is present, it is returned immediately to the CPU. If the data is not present, the CPU is stalled for a time sufficient for the cache to load the required data from the memory.

The present invention, in effect, implements two types of load instructions. One load instruction operates in a manner analogous to the conventional load instruction described above. Data to be retrieved in response to this load instruction is processed through cache 16. The second load instruction is utilized for data having long latency times and/or would be likely to be used only a few times during its residency in cache 16 if it were loaded through cache 16. This second type of load instruction is processed through read-soon buffer 18. That is, data is returned to CPU 12 by read-soon buffer 18 when a load instruction of this second type is sent on bus 20. When a load instruction of the first type is sent on bus 20, the data is returned by cache 16.

The various load instructions are inserted by the compiler for data that is unlikely to be used more than once during the typical cache residence time for the system in question. The differentiation of the different types of data may be more easily understood with reference to a simple program. Consider a program which sums the entries in a large data array. It will be assumed that the data array is stored in contiguous memory locations in memory 14 and that the number of entries in the data array is a large fraction of the number of memory locations in cache 16. The program in question is a simple loop consisting of the instructions for incrementing an index register, issuing load instructions to memory 14, and adding the data which is returned to an accumulation register. The instructions in the loop are also "data" that will be initially stored in memory 14. However, once the loop begins, the instructions will be accessed via cache 16 because the instructions will be used over and over again during the running of the loop. In contrast, each data value in the data array will be used precisely once during the loop, and hence, will be accessed using the second type of load instruction. Nothing is gained by accessing these values through cache 16.

In fact, the advantages provided by cache 16 may be substantially reduced if the data array is accessed through the cache. The data array is assumed to be a large fraction of the total cache memory space; hence, a program that accessed the array through cache 16 would force cache 16 to overwrite a large fraction of its previously stored data. Some of that overwritten data may be needed by the portion of the program following the array operations. When the CPU requests this overwritten data, the cache will stall the CPU while it reloads the data in question. Hence, the system will lose time reloading the data without having gained any time in processing the array data that caused the cache to unload the data.

The present invention avoids this loss in efficiency by using load instructions of the second type to access the array data. Since these load instructions do not cause data in the cache to be overwritten, the loss in efficiency is avoided.

As noted above, the time delay encountered in accessing data from memory 14 usually includes a long latency time. For data which is resident in cache 16 and accessed therefrom a number of times during its residency, this latency time does not substantially slow down the system, since the latency time may be amortized over several uses of the data. However, for data accessed only once, i.e., data provided by read-soon buffer 18, this latency time is a major problem.

The effects of this latency time can, in principle, be eliminated if a preload instruction is issued in advance of the actual load instruction. A preload instruction informs the read-soon buffer that a load instruction for data at the address indicated in the preload instruction will shortly be issued by the CPU. The preload instruction does not result in the return of any data to the CPU. As will be explained in more detail below, in the preferred embodiment of the present invention, the second type of load instruction is implemented using a preload instruction. When a preload instruction is encountered by read-soon buffer 18 on bus 20, read-soon buffer 18 initiates a load operation to acquire the data specified by the address in the preload instruction. First, read-soon buffer queries cache 16 to determine if the data in question is stored therein. If it is, read-soon buffer 18 reads the data from cache 16 into a storage register in read-soon buffer 18. If the data is not stored in cache 16, read-soon buffer 18 initiates a load from memory 14. Denote the latency time in instruction cycles of memory 14 by $T_t$. If the preload instruction is given at least $T_t$ cycles prior to the load instruction that actually transfers the data to CPU 12, the effects of the latency time will be essentially eliminated.

To effectively use a preload instruction, read-soon buffer 18 must be sure that the data stored in read-soon buffer 18 at the time the corresponding load instruction is detected on bus 20 is the correct data for the address in question. As noted above, the preload instruction must be given at least $T_t$ instructions prior to the corresponding load instruction to completely eliminate the effect of the latency time. If the instructions between the preload instruction and the corresponding load instruction include one or more store instructions directed to the address in question, the data fetched from cache 16 or memory 14 in response to the preload instruction may no longer be valid.

In the preferred embodiment of the present invention, read-soon memory 18 maintains a copy of the data for the address in question. When read-soon memory 18 receives a preload instruction for an address A, it first queries cache 16 to determine if the data for address A is in cache 16. If the data in question is in cache 16, read-soon memory 18 reads the data from cache 16 into a register in read-soon buffer 18. If the data is not present in cache 16, a load instruction is issued to memory 14. This load instruction results in the data that is currently stored for address A in memory 14 being delivered to read-soon memory 18 $T_t$ instruction cycles later. In the meantime, a store instruction directed to address A may be issued. Hence, read-soon memory 18 monitors bus 20 for store instructions to addresses for which it has received a preload instruction. When such an instruction is detected, the value specified in the store instruction is stored in read-soon buffer 18 and a flag is set to indicate that any value subsequently received from memory 14 or cache 16 for the address in question is to be ignored. Hence, read-soon memory 18 will always return the most up to date data for the address in question, and any problems associated with store instructions between the preload and load instructions are avoided.

While the above discussion has assumed that the preload instruction is given at least $T_t$ instructions before the corresponding load instruction, it should be pointed out that the present invention will still function properly if the time interval between the preload and load instructions is less than this value. In this case, only part of the latency time will be eliminated.

While the above discussion has utilized two different types of load instructions, one directed to cache 16 and one to read-soon buffer 18, it will become apparent from the following discussion that only one type of load instruction is needed if a preload instruction is utilized to differentiate the two types of load operations. When a normal load instruction is received after a preload instruction, both read-soon buffer 18 and cache 16 examine the address in the load instruction. If read-soon buffer 18 has the data for that address, it returns the data in question and does not create an entry in cache 16. That is, the load is treated as load instruction of the second type. If the data is not in read-soon buffer 18, the data is supplied via cache 16. In this case, it is treated as if it is being fetched via a load instruction of the first type.

Figure 2:
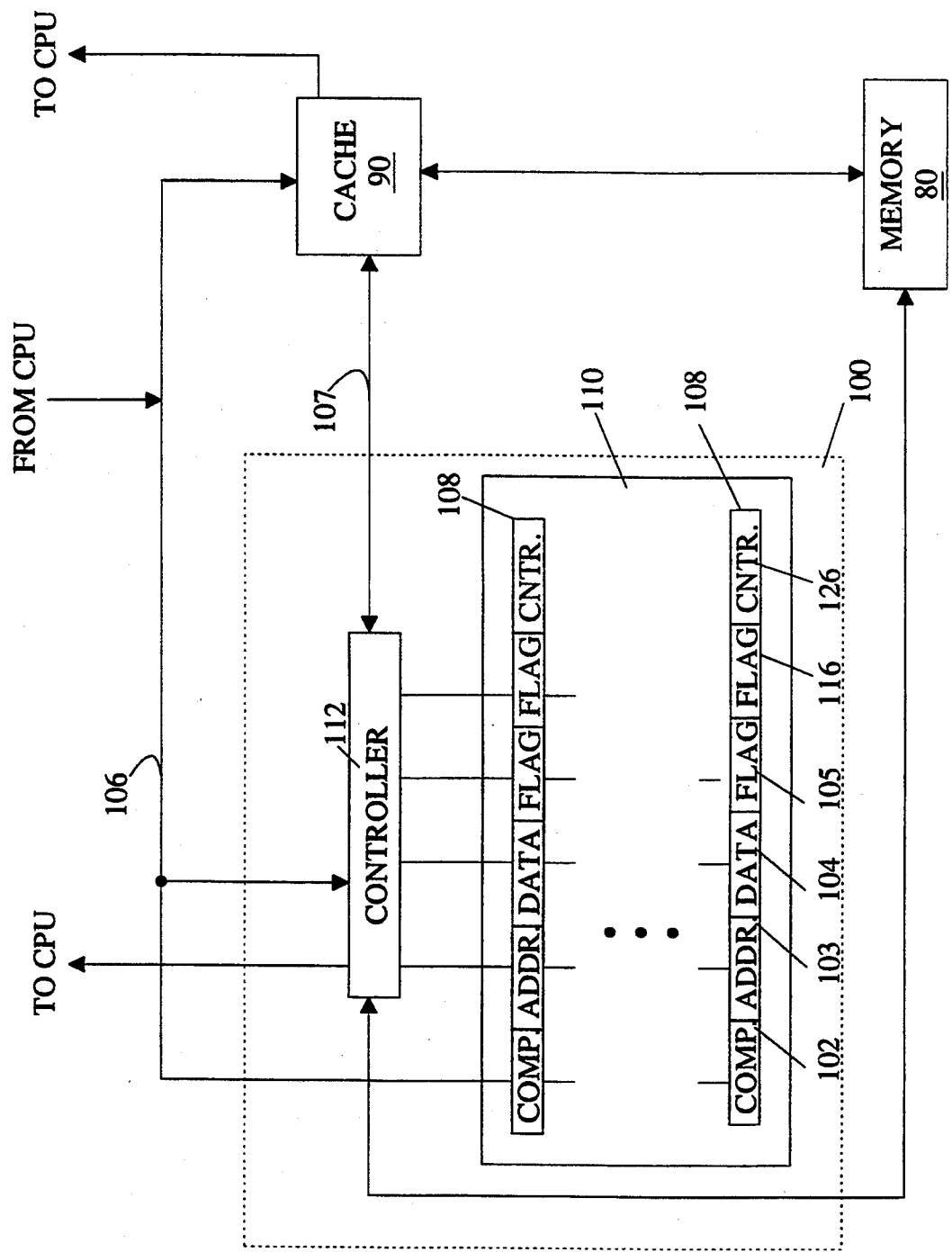
FIG. 2 is a block diagram of a read-soon buffer according to the present invention.

A more detailed block diagram of the preferred embodiment of a read-soon buffer 100 according to the present invention is shown in FIG. 2. Read-soon buffer 100 includes a register file 110 which includes a plurality of register sets 108. Each register set 108 includes space for storing the information needed to service one preload. The storage space in question includes a register 103 for storing the address specified in a preload instruction, a register 104 for storing the data to be returned to the CPU when the corresponding load instruction is received, and a flag 105 for indicating that the data stored in register 104 is more current than the data currently in memory 80. The operations of read-soon buffer 110 are controlled by a controller 112 which monitors bus 106 for preload instructions, load instructions directed to read-soon buffer 110, and store instructions. Controller 112 also communicates with cache 90 and memory 80 which provide the functionality described above with reference to cache 16 and memory 18.

When controller 112 detects a preload instruction on bus 106, it causes the address associated with said instruction to be stored in the next free register set 108. A flag 116 may be used to indicate register sets that may be overwritten. The flag 105 associated with that register set is then set to a first value. Controller 112 then queries cache 90 via bus 107 to determine if the dam for the address in question is currently located in cache 90. If the data is in cache 90, controller 112 reads the data from cache 90 into the corresponding data register in register file 110. If the data in question is not found in cache 90, controller 112 requests the data from memory 80. When the data in question arrives, controller 112 checks the flag 105 in the register set to determine if the flag has been reset to a second value. If the flag has not been reset to a second value, controller 112 causes the data returned to be stored in the data register 104 in the register set in question.

When controller 112 detects a load instruction, it compares the address in the load instruction with the addresses stored in each of the active register sets 108. This comparison is preferably carried in parallel with the aid of a comparator 102 associated with each register set. If controller 112 does not detect a matching address in one of the active register sets 108, then the load instruction must be directed to cache 90 and controller 112 ignores the load instruction in question. If controller 112 detects a matching address in one of the active register sets 108, then the load instruction in question must be directed to read-soon buffer 110 and not cache 90. In this case, controller 112 signals cache 90 to ignore the load instruction in question. This signal may be sent on bus 107. If the load instruction is directed to read-soon buffer 110 and the data has been loaded into the corresponding data register 104, controller 112 returns the data in question to the CPU. If the data is not yet present, controller 112 causes the CPU to stall until the data is received from memory 80 or cache 16.

Each time a preload instruction is received by read-soon buffer 110, a register set 108 must be assigned to hold the data specified in the address portion of the instruction. Since there are a finite number of registers, read-soon buffer 110 must replace the contents of one of the register sets. A number of different replacement strategies may be implemented. For example, once the data has been delivered to the CPU, read-soon buffer 110 can mark the register set in question as being free by setting flag 116.

A number of alternative replacement strategies will be apparent to those skilled in the cache memory arts. Any of the replacement strategies developed for conventional cache operations may, in principle, be utilized in a read-soon buffer according to the present invention. For example, the oldest entry in register file 100 could be assigned to service the new preload instruction. The age of an entry in register file 100 may be determined by a counter 126 which is associated with each register set. The counter is incremented on each instruction cycle and reset each time the register set is assigned to a new preload instruction.

While the above described embodiments of the present invention store the data in the read-soon buffer, it will be apparent to those skilled in the art that other storage arrangements are possible. For example, the data portion of an entry (register 104) can be stored in a CPU register. In this case, register 104 would be replaced by a smaller entry which indicates the identity of the CPU register in which the data is stored.

Read-soon buffer 100 also monitors bus 106 for store instructions. If a store instruction is detected, read-soon buffer 100 compares the address in the store instruction with each of the addresses stored in registers 103. If a matching address is found, the data specified in the store instruction for that address is stored in the corresponding data register 104. The corresponding flag 105 is then set to the second value to guarantee that the data register is not overwritten by data returning from memory 80. In the preferred embodiment of the present invention, the store instruction is also processed by cache 90 in the same manner that cache 90 processes other store instructions. This guarantees that the data specified in the store instruction will eventually be stored in memory 80 at the specified address.

The above discussion assumes that the word specified in the store instruction exactly matches the word length of the data entries stored in the buffer. This may not always be the case. For example, in some systems, the cache may store words that are several bytes long; while a store instruction may involve a single byte. In such systems, a separate flag such as flag 105 may be provided for each byte in data register 104. Each such flag would indicate that the corresponding byte had been supplied by a store instruction, and hence, the value for that byte returned in response to the preload instruction is to be ignored.

Consider the case in which the address in the store instruction does not match any of the entries in read-soon buffer 100. There are two possible responses, either a new entry is created in read-soon buffer 100 or one is not created. The system will work correctly in either case. If a new entry is created, the new entry has the same effect as preload for the address in question. Hence, a subsequent load will benefit from the reduced latency.

To achieve good performance, the minimum number of registers in read-soon buffer 100 can be determined by the latency time of a load instruction. If the preload instructions are always inserted in the code precisely $T_t$ instructions in front of the corresponding load instruction, then each preload instruction will cause one register in read-soon buffer 100 to be occupied for $T_t$ instructions. Hence, read-soon buffer 100 requires a minimum of $T_t$ register sets 108. If the placement of the preload instructions is not so precise, more register sets will be needed. However, even if twice the minimum number of register sets is used, the size of register file 110 will be a very small fraction of the size of cache 90 which is typically thousands of memory locations.

The use of read-soon buffer 100 to avoid contamination of the cache 90 by data flowing from memory 80 to the CPU significantly reduces the amount of memory needed by cache 90. However, data flowing from the CPU to memory 80 via store instructions can also contaminate cache 90 with data that will not be used again during its residence in cache 90. Consider a simple program in which each element of an array is multiplied by a number and then stored back in memory 80. The contamination of cache 90 by the flow of array elements from memory 80 to the CPU and the latency time losses inherent in these data fetch operations are alleviated by read-soon buffer 100. However, if the new array elements are returned to memory via conventional store instructions, the values will initially be stored in cache 90. This incoming data will displace other data in cache 90. Since the incoming data is not likely to be used again during its residency in cache 90, while some of the displaced data would have been used again, this storage scheme results in a loss of cache efficiency.

In the preferred embodiment of the present invention, this loss in efficiency is alleviated by providing a second type of store instruction which will be referred to as a cache store bypass instruction. When data is to be stored without going through cache 90, the data is sent to memory via a cache store bypass instruction. Embodiments in which this instruction can be acted upon by read-soon buffer 100, cache 90, or directly by memory 80 will be apparent to those skilled in the art. The important feature of this instruction is that it results in data being stored in memory 80 without using space in cache 90 en route. However, in any of these embodiments, read-soon buffer 100 still must recognize the store bypass instruction as a "store" instruction and update any value in its register file for the address specified in the instruction.

If a preload instruction is received and no corresponding load instruction is subsequently received, the register set 108 used to store the data may remain occupied indefinitely. However, there are situations in which it would be advantageous to allow the CPU to generate preload instructions that are not necessarily followed by load instructions. For example, it may be advantageous to issue preload instructions for data on both branches of an "if-then-else" statement before the argument determining the branch actually taken is evaluated. In this case, one set of preload instructions will not be followed by load instructions. To avoid problems with indefinite occupancy of a register set 108 when the load instruction corresponding to the preload instruction that setup the register set is not received, each register set includes a counter 126 which is used to store the elapsed time in instruction cycles since the preload was received. This count is set to a predetermined value by controller 112 when the preload is received and stored. The count is then updated on each instruction cycle. If the age of the data exceeds some predetermined number of instruction cycles, Controller 112 is free to overwrite the data in the register set in question.

While the present invention has been described in terms of a buffering system having a cache and a read-soon buffer, the present invention can be implemented in a single cache provided the cache can implement two different update algorithms and respond to two different "load" instructions. In normal cache operation, data is replaced as new data enters the cache in response to load or store instructions. In a conventional cache, the specific data entries that are overwritten in the cache depend on the length of time the data entry has resided in the cache without being referenced by a load or store instruction. In conventional cache memories, data is overwritten based on the age of the data, the older data being replaced first.

The read-soon buffer described above behaves in a manner analogous to a cache in which data is replaced if it has been used or if the data entry in the register file is older than some predetermined number of instruction cycles. A register set 108 may be overwritten as soon as the data stored therein is delivered in response to a load instruction. In this sense, read-soon buffer 100 implements a replacement strategy in which the newest data is replaced first. In general, the data replacement algorithm does not depend on the age of the data. The replacement algorithm, however, does depend on the age of the preload instruction. If the data entry is older than some predetermined number of instructions as measured by counter 126 shown in FIG. 3, the data may also be replaced.

Figure 3:
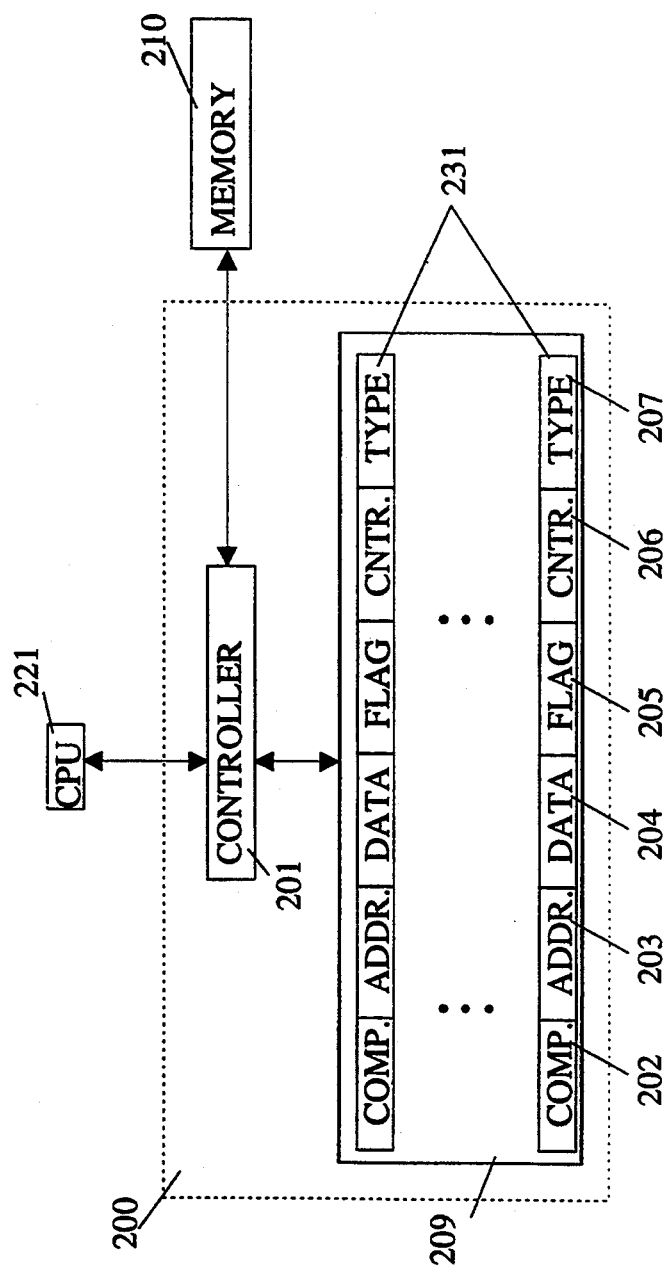
FIG. 3 is a block diagram of a combined cache system according to the present invention.

These two data replacement strategies can be implemented in a single cache which is structurally similar to read-soon buffer 100 described above. A block diagram for a combined cache 200 is shown in FIG. 3. Cache 200 manages data storage and retrieval from memory 210 for CPU 221. Cache 200 includes a controller 201 and a register file 209 having a plurality of register sets 231. Controller 201 receives store, preload, and load instructions from CPU 221. Upon receiving load or preload instructions, controller 201 attempts to service the instructions from data stored in register file 209. If the data is not located in register file 209, controller 201 causes the data to be loaded from memory into register file 209.

Upon receiving a store instruction, controller 201 stores the data in register file 209 if the instruction was a conventional store. If the store instruction was a bypass store instruction, controller 201 causes the data to be stored directly in memory 210. In both cases, controller 201 checks the register sets 231 in register file 209 to determine if the latest copy of the data is stored therein. If controller 201 finds the data in a register set 231, it updates the data and resets flag 205 to indicate that the copy of the data in register 204 supersedes the copy stored in memory 210 for the address in question. Controller 201 may also write the new data directly to memory 210 depending on the replacement strategy implemented in cache 200. Controller 201 may also be used to implement the second type of storage instruction discussed above, i.e., a storage instruction that bypasses cache 200 and stores data directly in memory 210.

Each register set 231 in register file 209 includes a comparator 202 for matching the contents of an address register 203 with an address presented to controller 201. The current data for the address in question is stored in a data register 204. Each register set also includes a flag 205 for indicating if the data stored in the register set differs from that stored in memory 210 at the corresponding address. If this flag is set at the time the register set is to be replaced with new data, controller 201 causes the contents of data register 204 to be written to memory 210 at the address indicated in address register 203. Each register set 210 also includes a counter 206 for measuring the age of the data stored therein and a second flag 207 for specifying the type of replacement strategy that is to be used with the data stored in the register set. Flag 207 is set to a first value if the register set has been set in response to a preload instruction and a second value if the data has been stored in response to a conventional load or store instruction.

Counter 206 is used for measuring the age of the data. The meaning of the "age" of the data is determined by the state of flag 207. If flag 207 indicates that the register set is being used to store data retrieved in response to a preload instruction, the age indicates the number of instructions that have elapsed since the preload instruction was received. When a pre load instruction is received, a register set is set aside for the dam. The register set in question can be assigned to be a read-soon register set by resetting the counter 206 associated with the register set and changing the contents of flag 207. If flag 207 indicates that the register set is being used for a conventional cache operation, counter 206 measures the number of instructions cycles since the last use of the data.

On each instruction cycle, all of the counters are updated regardless of the type of information stored in the corresponding register set. If controller 201 needs to replace data, it does so by replacing the data having the highest counter value. If the data is sent in response to a load instruction corresponding to a preload instruction or the data entry exceeds the critical age, i.e., no load was received corresponding to the preload, the counter may be set to its maximum value thereby guaranteeing that the register set in question will be overridden instead of a register set operating as a conventional cache register set.

The above described embodiments of the present invention includes a register set in the read-soon buffer to be overwritten as soon as the data word stored therein was delivered to the CPU. It will be apparent to those skilled in the art that other replacement strategies may be utilized. In fact, any replacement strategy that can be used in a conventional cache may be used with the present invention. For example, overwrite can be enabled after the data has been delivered a predetermined number of times. Such embodiments would require an additional counter to keep track of the number of times the data word was delivered. In this embodiment, the preload instruction would provide an initial count that would be decremented each time data was delivered. When the count reached zero, overwriting the register set would be enabled.

Accordingly, there has been described herein a novel computer cache system. Various modifications to the present invention will become apparent to those skilled in the art from the foregoing description and accompanying drawings. Hence, the present invention is to be limited solely by the scope of the following claims.

What is claimed is:

1. A memory buffer system for delivering information stored in a memory to a data processing system in response to load instructions and store instructions from said data processing system, said buffer system comprising:

storage means for storing data words to be delivered to said data processing system in response to said load instructions, said storage means comprising means for storing a plurality of data records, each said data record comprising an address, data associated with said address, and means for indicating if said record can be overwritten;

means for receiving a load instruction from said data processing system, said load instruction comprising an address;

means for sending the data word corresponding to said address in said received load instruction to said data processing system if said data is stored in said storage means and for causing said indicating means to indicate that the data record in which said data word was stored may be overwritten;

buffer loading means for loading a data word stored in said memory at a specified address into one of said data records in said storage means, said data record having an indicating means indicating that said data record may be overwritten and for causing said specified address to be stored in said address in said record; and storage update means for receiving a store instruction from said data processing system, said store instruction comprising an address and a data word to be stored in said memory at said address, said storage update means further comprising means for causing said data word in said received store instruction to be stored in one of said data records in said storage means if said address in said data record matches said address in said received store instruction.

2. The memory buffer system of claim 1 further comprising:

means for receiving a preload instruction specifying an address in said memory system; and means for causing said buffer loading means to load the data word specified by said address in said preload instruction to be loaded into one of said data records in said storage means.

3. The memory buffer system of claim 2 wherein said means for causing said buffer loading means to load said data word comprises:

means for causing said buffer loading means to load said address of said data word in one of said data records having an indicating means indicating that said data record can be overwritten; and means for transmitting an instruction to said memory, said instruction causing said memory to send said data word to said buffer loading means after a delay wherein each said record in said storage means further comprises flag means having a first state for preventing said data word received from said memory from being stored in the record in which said address is stored and a second state enabling said data word to be stored in said record, said flag means being set to said second state when said buffer loading means causes said address to be loaded in said data record wherein said storage update means causes said flag means to be set to said first state when said storage update means causes a data word to be stored in said record.

4. The memory buffer system of claim 2 wherein said storage means further comprises means for measuring the elapsed time since the receipt of said preload instruction, and means for causing said indicating means in the data record in which said specified address is stored to indicate that said record may be overwritten if said elapsed time is greater than a predetermined elapsed time.

5. The memory buffer system of claim 1 further comprising:

cache buffer means for storing data words to be delivered to said data processing system in response to said load instructions, said storage means comprising means for storing a plurality of data records, each said data record comprising an address, data associated with said address, and means for determining the elapsed time since either one of said load instructions or one of said store instructions having an address matching said address was received in a previous load or store instruction, respectively; said cache memory means being connected to said memory and said buffer loading means; and means for causing said buffer loading means to load said data word from said cache buffer means if said specified address is contained in one of said records in said cache buffer means.

6. A memory buffer system for delivering information stored in a main memory to a data processing system in response to load instructions and for storing information in said main memory in response to store instructions from said data processing system, said buffer system comprising:

a cache memory operatively connected to said data processing system and said main memory; and a buffer sub-system, said buffer sub-system comprising:

means for receiving preload, load and store instructions from said data processing system, each of said instructions comprising an address;

means for receiving data from said cache memory;

means for receiving data from said main memory;

register file for storing one or more data entries, each said data entry comprising an address and a data word; and control means comprising:

means, responsive to a received load instruction, for causing the most recent value for the data identified by the address in said received load instruction to be delivered to said data processing system;

means for controlling said cache sub-system including means for receiving data from said cache sub-system;

preload means, responsive to a received preload instruction, for causing the data associated with the address in said preload instruction to be stored in said register file; and update means, responsive to a received store instruction, for updating a data word stored in said register file if said address in said store instruction matches the address of one of said data entries in said register file.

7. The memory buffer system of claim 6 wherein said preload means comprises:

means for assigning a data entry in said register file upon receipt of said preload instruction;

means for loading said data entry with the data corresponding to said address if said data is stored in said cache sub-system and said update means has not updated the value stored in said register; and means for loading said data entry with said data corresponding to said address from said main memory if said update means has not updated the value stored in said register.

* * * * *